Dec. 29, 1964 D. J. CARLSON ETAL 3,163,822
AUTOMATIC FREQUENCY CONTROL SYSTEM UTILIZING A REFERENCE OSCILLATOR
Filed Dec. 30, 1960 2 Sheets-Sheet 1
Fig. 2.
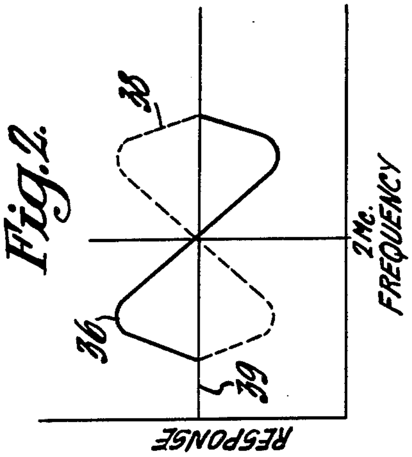
Fig. 1.
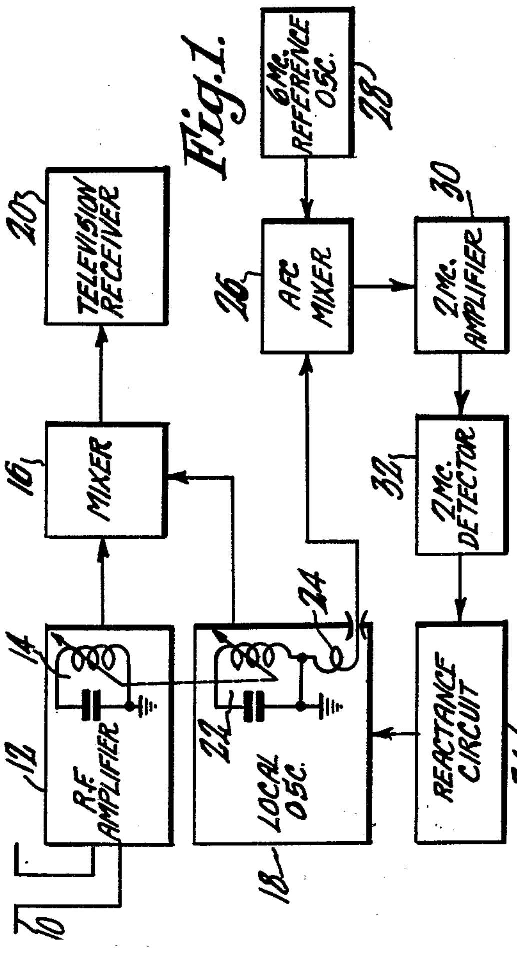
| TELEVISION CHANNEL | LOCAL OSC. FREQUENCY (Mc) | REF. OSC. HARMONIC | HARMONIC FREQUENCY (Mc) | 2 Mc. DET. SIGN |
|---|---|---|---|---|
| 2 | 100 | 17 | 102 | + |
| 3 | 106 | 18 | 108 | + |
| 4 | 112 | 19 | 114 | + |
| 5 | 122 | 20 | 120 | − |
| 6 | 128 | 21 | 126 | − |
| 7 | 220 | 37 | 222 | + |
| 8 | 226 | 38 | 228 | + |
| 9 | 232 | 39 | 234 | + |
| 10 | 238 | 40 | 240 | + |
| 11 | 244 | 41 | 246 | + |
| 12 | 250 | 42 | 252 | + |
| 13 | 256 | 43 | 258 | + |
Fig. 3.
INVENTORS.
DAVID J. CARLSON
& GEORGE B. WATERS
BY
[signature]
ATTORNEY INVENTORS
DAVID J. CARLSON
& GEORGE B. WATERS
BY
[signature]
ATTORNEY United States Patent Office 3,163,822

Patented Dec. 29, 1964

3,163,822

AUTOMATIC FREQUENCY CONTROL SYSTEM UTILIZING A REFERENCE OSCILLATOR

David J. Carlson, Haddon Heights, N.J., and George B. Waters, Philadelphia, Pa., assignors to Radio Corporation of America, a corporation of Delaware Filed Dec. 30, 1960, Ser. No. 79,715
2 Claims. (Cl. 325—421)

This invention relates to the automatic control of the tuning of a television receiver and particularly to an automatic frequency control system for the local oscillator of a super-heterodyne television receiver which system utilizes a single crystal-controlled device.

In addition to a VHF channel-selecting mechanism, many television receivers have a fine tuning control to provide the user with a more precise frequency control over the local heterodyne oscillator. In order to provide the optimum image on the television screen together with the optimum sound, it is necessary that the receiver local oscillator be adjusted so that the picture and sound carriers are located at the correct points in the intermediate frequency (IF) passband of the television receiver. This is especially true in the tuning of a color television receiver. Not only must the picture and sound carriers be situated at their proper positions in the IF passband, but also the color subcarrier must be properly positioned in the passband in order that the colors will be reproduced on the face of the kinescope with the proper hue and saturation characteristics. It is desirable that the operator of a television receiver be freed of the requirement of making any fine tuning adjustment of the local oscillator.

It is, therefore, an object of this invention to provide an improved automatic frequency control system for the local oscillator of a superheterodyne television receiver.

It is also an object of this invention to provide an improved automatic frequency control system for a television receiver tunable in the VHF television band which system uses a single crystal-controlled device to produce the correct local oscillator frequency when the receiver is tuned to any of the 12 VHF television channels.

These and other objects of the invention are effected by using a single crystal-controlled device to control an automatic frequency control circuit for the local oscillator of the television receiver. As is known, the Federal Communications Commission (FCC) has established 12 VHF television channels for commercial television broadcasting and the frequency of the picture carriers within each of these channels has been established. In accordance with the invention, the intermediate frequency of the receiver, the local oscillator frequencies for all 12 VHF channels and the frequency of a crystal-controlled reference oscillator are chosen so that the local oscillator frequency for each of the 12 VHF channels differs by a fixed amount from a different harmonic of the crystal-controlled reference oscillator. Thus, a reference frequency from the crystal-controlled oscillator is mixed with the local oscillator frequency for any given channel and the difference frequency output signal of the mixer is applied to a detector circuit. If the difference frequency deivates from the fixed amount specified, the detector circuit generates a control signal which is applied to a reactance device connected with the tuning elements of the local oscillator to correct the frequency of the local oscillator until the difference frequency is substantially equal to the fixed amount specified.

The invention will be better understood when the following description is read in connection with the accompanying drawings in which:

FIGURE 1 is a block diagram of a television receiver having an automatic frequency control system in accordance with the invention;

FIGURE 2 is a graph showing curves illustrating certain operational features of the circuit of FIGURE 1;

FIGURE 3 is a table illustrating several other operational features of the circuit of FIGURE 1 and;

Figure 4:
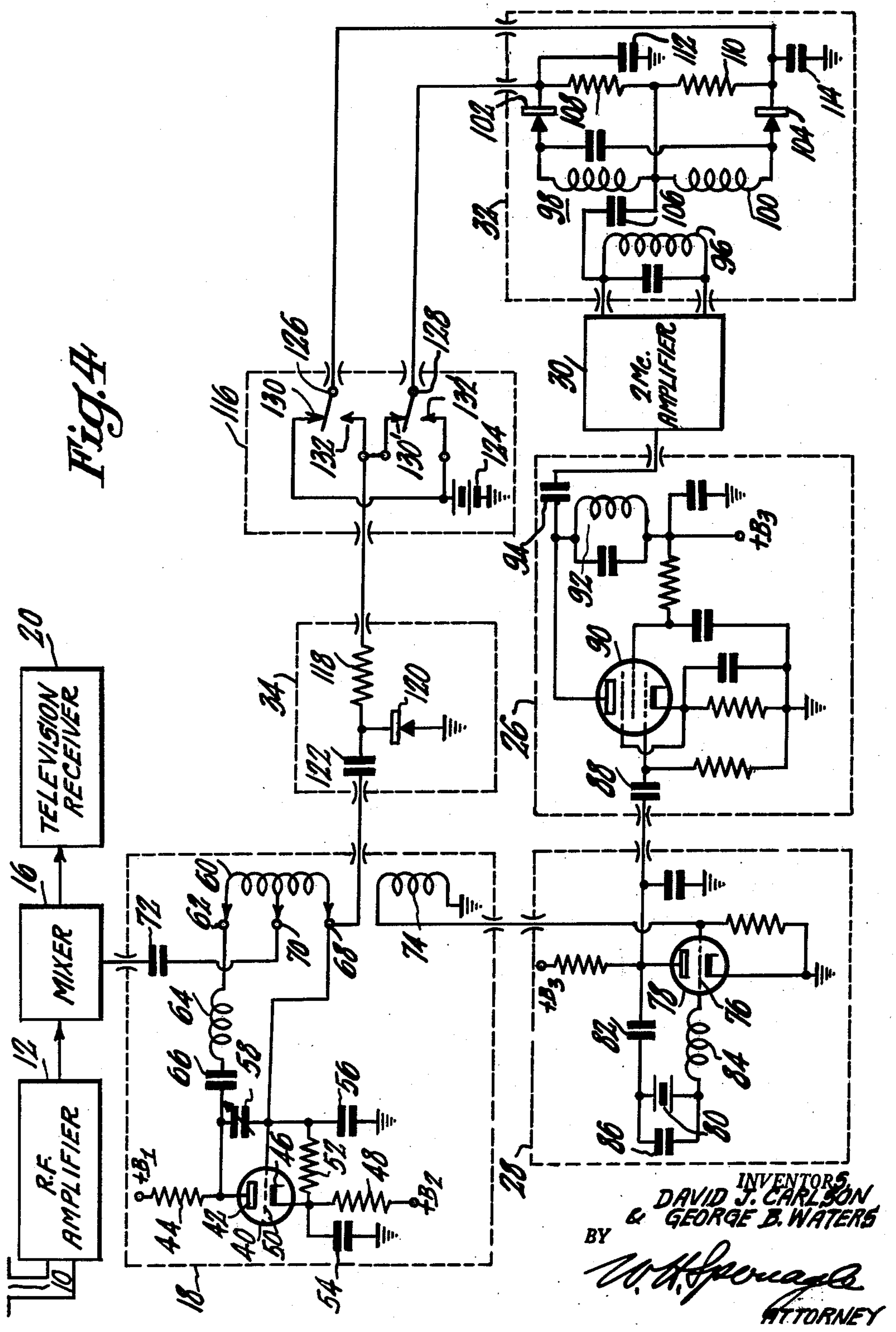
FIGURE 4 is a schematic circuit diagram (with conventional elements in block form) of a television receiver utilizing an automatic frequency control circuit in accordance with one embodiment of the invention.

Referring now to the drawings and in particular to FIGURE 1, the signal-receiving and tuning apparatus for a television receiver includes an antenna 10 to intercept and apply a television signal to a radio frequency (RF) amplifier 12 which includes an inductive-capacitive tuning circuit 14. After the signal is amplified by the RF amplifier 12, it is applied to a mixer circuit 16 where the radio frequency signal is mixed with a local oscillator signal derived from a local oscillator 18. It is to be understood that the RF amplifier 12, the mixer 16 and the local oscillator 18 may be conventional tuner elements as exemplified in RCA Service Data 1958—No. T10. Heterodyning between the local oscillator signal and the radio frequency signal results in an intermediate frequency (IF) output signal from the mixer 16 which is applied to a television receiver 20. Details of the television receiver 20 have not been illustrated in the interests of simplicity since they may be conventional and form no part of the invention. It is to be understood that such a television receiver includes an intermediate frequency amplifier, a video detector, a video amplifier, sound signal circuits and deflection control circuits and a cathode ray picture reproducing tube. For an embodiment of the invention in a color television receiver, there will also be included color signal processing apparatus and circuits such as color demodulators, matrixing amplifiers and the like.

The local oscillator circuit 18 includes an inductive-capactive tuning element 22, much the same as the tuning circuit 14 for the RF amplifier 12. The local oscillator and RF amplifier tuning circuits are ganged as in a conventional television receiver as illustrated by the broken line between the RF amplifier tuning element 14 and the local oscillator tuning element 22. Also, a television receiver is generally tunable in discrete steps within the VHF band so that the tuning elements 14 and 22 would normally be tunable in discrete steps from channel to channel.

In accordance with the invention, a portion of the local oscillator signal, which exists in the oscillator circuit 18 and particularly across the oscillator tuning element 22, is derived by suitable means such as a loop 24 which is inductively coupled to the inductance component of the oscillator tuning element 24 and is applied to an AFC mixer circuit 26. It is to be understood that, alternatively, capacitive coupling may be used. Also applied to the AFC mixer circuit is the output of a 6 megacycle (mc.) crystal-controlled reference oscillator circuit 28 which is rich in harmonic frequencies. The output of the mixer circuit is applied to a 2 mc. amplifier circuit 30. As will be more fully explained hereinafter, the local oscillator circuit has such a frequency for each television channel that, at correct tuning, the difference between each local oscillator frequency and a harmonic of the 6 mc. crystal oscillator is exactly 2 mc. The output of the 2 mc. amplifier is applied to a 2 mc. detector 32 and the output of the 2 mc. detector is applied to a reactance circuit 34 which is connected to control the frequency of the local oscillator 18.

In order to more fully understand the operation of the automatic frequency control circuit in accordance with this invention, reference now is made to the table of FIGURE 3. In this table there is noted the number assigned by the FCC to each VHF television channel, the local oscillator frequency for each channel, the harmonic frequency from the crystal-controlled reference oscillator which, when mixed with the correct local oscillator frequency, equals 2 mc. and the detector output sign which is indicated as either positive or negative. The local oscillator frequencies have been chosen to produce an IF picture carrier of 44.75 mc. and a sound carrier of 40.25 mc. It will be noted that, for all television channels with the exception of channels 5 and 6, a harmonic frequency of the reference oscillator is 2 mc. higher than the local oscillator frequency, but on channels 5 and 6 the reference oscillator harmonic frequency is 2 mc. lower than the local oscillator frequency. This is the meaning of the detector output sign and its significance will be more adequately explained hereinafter.

The response characteristic of the 2 mc. detector 32 is indicated in FIGURE 2. The output signal from the 2 mc. detector of a particular frequency is a direct voltage represented by the point on the characteristic curve corresponding to that frequency. The solid curve 36 is the 2 mc. detector characteristic which is used when the local oscillator is tuned to all VHF channels with the exception of channels 5 and 6. The dotted curve 38 is the 2 mc. detector characteristic which is used when the local oscillator is tuned to channels 5 and 6. It will be noted that these two characteristic curves of the 2 mc. detector are merely of reversed polarity. One means of accomplishing this polarity reversal will be disclosed when the circuit of FIGURE 4 is discussed hereinafter. As will also be explained in the subsequent description of FIGURE 4, the output signal from the 2 mc. detector may be superimposed on a fixed bias for the reactance device. Such fixed bias is represented by the line 39 of FIGURE 2 and such response will be referred to in the following description as a "normal" output signal from the detector, it being understood that such signal corresponds to a "no-signal" output from the detector itself.

In operation, the local oscillator is set to a particular channel. Assume for example, that the local oscillator is to be tuned to channel 3. From the table of FIGURE 3 it is indicated that the local oscillator frequency should be 106 mc. The local oscillator frequency is applied to the AFC mixer 26 where it beats with the 18th harmonic frequency of the 6 mc. reference oscillator 28 which is 108 mc. If the local oscillator frequency is exactly 106 mc., the output from the AFC mixer 26 will be exactly 2 mc. When this 2 mc. signal is applied to the 2 mc. detector 32, a normal output signal is derived therefrom and thus the reactance circuit 34 does not change the local oscillator frequency.

However, if the local oscillator frequency is higher than 106 mc., the output from the AFC mixer 26 will be less than 2 mc. and it is seen from the curve 36 of FIGURE 2 that the output signal of the 2 mc. detector 32 will be greater than normal. When applied to the reactance circuit 34, this detector output signal decreases the local oscillator frequency until it is the desired 106 mc., at which point the detector output signal is normal and no further change of the local oscillator frequency is effected.

FIGURE 2 also indicates that, if the local oscillator frequency on channel 3 is too low and produces greater than a 2 mc. difference in the AFC mixer circuit 26, the output of the 2 mc. detector 32 will be less than normal. This decreased output from the 2 mc. detector, when applied to the reactance circuit 34, increases the frequency of the local oscillator to bring it to the desired 106 mc.

If channels 5 and 6 are being controlled, it is necessary to reverse the polarity of the output signal from the 2 mc. detector 32 since, as indicated in FIGURE 3, the correct local oscillator frequency for these channels is greater by 2 mc. than the harmonic frequency of the reference oscillator. Consequently, an increase in the local oscillator frequency produces an output signal from the AFC mixer 26 which is greater than 2 mc. As may be seen from FIGURE 2, in order to obtain a greater than normal output signal from detector 32 in response to a frequency in excess of 2 mc., it is necessary to use the reversed polarity output signal as represented by the broken line curve 38. The same is true if the frequency of the local oscillator 18 decreases and a less than normal output signal from detector 32 is required, when channels 5 and 6 are selected.

It should be particularly noted that an automatic frequency control circuit in accordance with the invention does not derive its control signal through the intermediate frequency amplifier of the television receiver, but rather controls the local oscillator frequency directly from the local oscillator signal itself. Thus, various signals that may be present in either the RF or IF amplifiers of the receiver, cannot affect either the stability of the system or cause blocking of the system by a spurious signal. The automatic frequency control system is effectively isolated from all signals within the signal transmission channel of the receiver. It is also particularly significant that a single crystal-controlled reference oscillator is used for the control of all 12 television channels. This results not only in an extremely stable system that is well within the most stringent requirements of a television receiver, but one which also is relatively economical. Another feature of the invention is that the amplifier 30 for the output signal of the AFC mixer 26 operates at 2 mc., thereby enabling a very high gain control system to be built at this relatively low frequency where there is a minimum drift in the value of the components used in the amplifier circuit. There is also no switching from one reference frequency to another required of the automatic frequency control system, since this is automatically determined by the particular reference oscillator harmonic which will beat with the local oscillator signal.

Referring now to FIGURE 4, a particular embodiment of the invention is illustrated and includes an antenna 10, an RF amplifier 12, a mixer circuit 16, a local oscillator circuit 18, and a television receiver 20 as described in connection with FIGURE 1. The block elements of FIGURE 1 also are indicated and designated by the same reference numerals in FIGURE 4. The oscillator circuit 18 and the components of the automatic frequency control system of this invention have been illustrated, however, in detail. The local oscillator 18 of the receiver includes an electron tube 40 to which are connected suitable components to produce the desired frequency of oscillation. Energization current is supplied to the tube by connecting the anode 42 through an anode resistor 44 to a first source of positive polarity B1 and the cathode 46 is connected through a cathode resistor 48 to a second source of positive polarity B2 which is of less magnitude than that of source B1. Suitable bias is supplied to the control grid 50 of the tube through a resistor 52 connected between the cathode 46 and the control grid 50, the cathode and control grid being connected to ground through capacitors 54 and 56 respectively. The frequency determining elements of the oscillator circuit are connected between the anode 42 and the control grid 50 and include a variable capacitor 58 connected directly between the anode 42 and the control grid 50 and a tapped inductor 60 which has one extremity connected to an anode terminal 62 and thence through an inductor 64 and a capacitor 66 to the anode 42 and the other extremity connected to a grid terminal 68 which is directly connected to the control grid 50. The tap of the inductor 60 is connected to an output terminal 70 which is in turn connected to the mixer 16 through a coupling capacitor 72. The inductor 60 is so illustrated to indicate that the local oscillator 18 is tunable to any of the local oscillator frequencies shown in the table of FIGURE 3 so that the television receiver may be tuned to any one of the 12 VHF television channels.

In accordance with the invention, a pickup loop 74 is placed within the oscillator compartment 18 and is connected to apply a portion of the oscillator signal to the control grid 76 of a 6 mc. reference oscillator tube 78. The reference oscillator tube 78 is connected as a conventional Pierce oscillator with a 6 mc. crystal 80 connected in series with a capacitor 82 and an inductor 84 between the anode and control grid of the tube 78. A small capacitor 86 may be connected across the crystal 80 to assure proper capacitive loading on the crystal. The inductor 84 is inserted to insure that the reference oscillator output signal is rich in harmonics.

The anode of the reference oscillator tube 78 is connected through a coupling capacitor 88 to the control grid of a mixer tube 90 to apply both the reference oscillator signal and the local oscillator signal thereto. The anode of the mixer tube 90 is connected to an inductive-capacitive circuit 92 which is tuned to 2 mc. and the output signal of the mixer tube is developed thereacross and is applied by a coupling capacitor 94 to the 2 mc. amplifier 30 which may be of a conventional design.

The output of the 2 mc. amplifier 30 is applied to the tuned primary 96 of a transformer 98, the secondary winding 100 of which has its extremity connected to the anodes of a pair of crystal rectifiers 102 and 104. The usual reference signal is applied to the secondary of the transformer by a capacitor 106 connected between one terminal of the primary 96 and the center tap of the secondary 100. A pair of resistors 108 and 110 are connected between the cathodes of the crystal rectifiers 102 and 104 and the cathodes are connected respectively to ground by a pair of radio frequency bypass capacitors 112 and 114. In order to complete the 2 mc. detector circuit, the junction of the resistors 108 and 110 is connected directly to the center tap of the secondary winding 100 of the transformer 98.

The cathodes of the crystal rectifiers 102 and 104 are connected to a polarity reversing switch 116. In one position of the switch the cathode of rectifier 102 is connected through a resistor 118 to the cathode of a reversed bias reactance diode 120 which is utilized as a variable capacitive reactance control device for the local oscillator tube 40, to the grid terminal 68 of which it is connected through a capacitor 122. Also, in that one switch position the cathode of the rectifier 104 is connected to a battery 124 which serves as a source of fixed reverse bias for the reactance diode 120. In the other position of the switch 116 the connections of the rectifiers 102 and 104 to the reactance diode 120 and the battery 124 are reversed.

More specifically, the polarity reversing switch comprises a pair of common terminals 126 and 128 to which the respective cathodes of the diodes 102 and 104 are connected. The switch also consists of an upper pair of contacts 130 and 130′ respectively for the common terminals 126 and 128 and to which the common terminals are normally connected. In the normal switch position as shown, the biasing battery 124 is connected through the upper contact 130 to the common terminal 126, thence through the resistors 110 and 108 of the detector and through the common terminal 128 and upper contact 130′ of switch 116 to the reactance diode 120. The common terminals 126 and 128 also have respective lower contacts 132 and 132′ to which they are connected for channels 5 and 6 operation of the receiver. It will be noted that, in this switch position, the biasing battery 124 is connected through the lower contact 132′ to the common terminal 128, thence through the two resistors 108 and 110 of the detector and through the common terminal 126 and lower contact 132 of switch 116 to the reactance diode 120. In this latter switch position, the polarity of the detector output is reversed from that obtained by the normal switch position to provide the proper correction voltage to the reactance diode as indicated by the curve 38 in FIGURE 2. The movable elements of the polarity reversing switch 116 may be operated from one position to the other as the television tuning mechanism is operated by any conventional means such as by a simple cam arrangement linked to the channel selecting apparatus.

Thus, in operation, the signal from the local oscillator 18 picked up by the pickup loop 74, together with the reference oscillator harmonic signals from the reference oscillator, are applied to the control grid of the mixer tube 90. The tuned circuit 92 selects the output of the mixer that is near or at 2 mc. and applies this signal to the detector through the 2 mc. amplifier 30. If the frequency of the signal is exactly 2 mc., as when the receiver is correctly tuned, a normal output signal is derived from the detector and the reverse bias voltage across the reactance diode 120 is determined fully by the battery 124 connected through the polarity reversing switch 116 as described. If the receiver is incorrectly tuned, the frequency of the signal applied to the detector deviates from 2 mc. In this case an output signal component is developed across the detector resistors 108 and 110. This output signal has a polarity dependent upon the sense of the deviation from 2 mc. and an amplitude dependent upon the magnitude of the deviation. The combination of this output signal with the fixed biasing voltage of the battery 124 either increases or decreases the reverse biasing of the reactance diode 120 which, in turn, changes the frequency of the local oscillator suitably to correctly tune the receiver.

While the detector 32 has been illustrated as a conventional discriminator circuit, it should be noted that a portion of the reference oscillator signal at 6 mc. may be derived from the oscillator tube 78 and applied directly at a three-to-one count down circuit to derive a 2 mc. signal which may be used as one signal for a product or phase detector in place of the discriminator shown.

Having thus described the invention, what is claimed is:

1. In an automatic frequency control system for a superheterodyne television receiver, in combination, channel selecting means for selecting any one of a plurality of television signal transmission channels, each of said channels corresponding respectively to a different radio frequency signal, the radio frequencies of a first group of said channels differing from one another by a fixed frequency or multiple thereof and the radio frequencies of a second group of said channels differing from the radio frequencies of said first group of channels by frequencies other than said fixed frequency or multiples thereof;

a variable frequency local oscillator;

means coupled to said channel selecting means and said oscillator for adjusting the frequency of said local oscillater at least approximately to that required for proper receiver response for said selected channel;

a crystal-controlled reference oscillator producing a signal of said fixed frequency and a plurality of signals at harmonic frequencies of said fixed frequency, said fixed frequency being selected so that the frequency of one of said plurality of signals differs by a given nominal frequency from the local oscillator frequency required for proper receiver response to each of said plurality of television signal transmission channels, said signals at harmonic frequencies having higher frequencies than said local oscillator frequency for one of said groups of channels and having lower frequencies than said local oscillator frequency for the other of said groups of channels;

a frequency mixer;

means coupling said local oscillator and said reference oscillator to said mixer to produce an output signal having said nominal frequency and which only deviates from said nominal frequency to the extent that said local oscillator frequency may differ from that required for said proper receiver response;

means coupled to said mixer for detecting any deviation in said output signal from said nominal frequency so as to produce opposite polarities of a control signal, each representative of the magnitude of said deviation;

reactance circuit means including a variable capacitance diode and responsive to said control signal for adjusting the frequency of said local oscillator precisely to that required for the transmission channel selected by said channel selecting means;

and means including a reversing switch coupled to said channel selecting means and connecting said detecting means to said reactance circuit means to impress upon said diode a selected polarity of said control signal dependent upon which one of said local oscillator and harmonic frequencies is the higher in the production of said output signal.

2. In an automatic frequency control system for a superheterodyne television receiver, in combination, channel selecting means for selecting any one of a plurality of television signal transmission channels, each of said channels corresponding respectively to a different radio frequency signal, the radio frequencies of a first group of said channels differing from one another by a fixed frequency or multiple thereof and the radio frequencies of a second group of said channels differing from the radio frequencies of said first group of channels by frequencies other than said fixed frequency or multiples thereof;

a variable frequency local oscillator;

means coupled to said channel selecting means and said oscillator for adjusting the frequency of said local oscillator at least approximately to that required for proper receiver response for said selected channel;

a crystal-controlled reference oscillator producing a signal of said fixed frequency and a plurality of signals at harmonic frequencies of said fixed frequency, said fixed frequency being selected so that the frequency of one of said plurality of signals differs by a given nominal frequency from the local oscillator frequency required for proper receiver response to each of said plurality of television signal transmission channels, said signals at harmonic frequencies having higher frequencies than said local oscillator frequency for one of said groups of channels and having lower frequencies than said local oscillator frequency for the other of said groups of channels;

a frequency mixer;

means coupling said local oscillator and said reference oscillator to said mixer to produce an output signal having said nominal frequency and which only deviates from said nominal frequency to the extent that said local oscillator frequency may differ from that required for said proper receiver response;

means coupled to said mixer for detecting any deviation in said output signal from said nominal frequency so as to produce opposite polarities of a control signal, each representative of the magnitude of said deviation;

reactance circuit means including a variable capacitance diode and responsive to said control signal for adjusting the frequency of said local oscillator precisely to that required for the transmission channel selected by said channel selecting means;

a source of a given polarity of fixed bias for said diode;

and means including a reversing switch coupled to said channel selecting means and connecting said detecting means and said fixed bias source to said reactance circuit means to impress upon said diode a biasing signal comprising a combination of said fixed bias and a selected polarity of said control signal, said fixed bias and said control signal being combined in like polarities in one position of said switch for television channels where said local oscillator frequency is higher by said nominal frequency than a harmonic frequency of said fixed frequency in the production of said output signal, and in opposite polarities in the other position of said switch for selected television channels where said local oscillator frequency is lower by said nominal frequency than a harmonic frequency of said fixed frequency in the production of said output signal.

References Cited in the file of this patent

UNITED STATES PATENTS

| | | |
|---|---|---|
| 2,555,391 | Bach | June 5, 1951 |
| 2,595,608 | Robinson et al. | May 6, 1952 |
| 2,685,032 | Cox | July 27, 1954 |
| 2,704,329 | Law | Mar. 15, 1955 |
| 2,810,832 | Broadhead | Oct. 22, 1957 |
| 2,855,506 | Schabauer | Oct. 7, 1958 |
| 2,860,246 | Jakubowics | Nov. 11, 1958 |
| 2,936,428 | Schweitzer | May 10, 1960 |